(12) United States Patent
Kolor et al.

(10) Patent No.: US 11,609,878 B2
(45) Date of Patent: Mar. 21, 2023

(54) PROGRAMMED INPUT/OUTPUT MESSAGE CONTROL CIRCUIT

(71) Applicant: Apple Inc., Cupertino, CA (US)

(72) Inventors: Sergio Kolor, Haifa (IL); Oren Bar, Herzliya (IL); Ilya Granovsky, Kiryat Tivon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/320,082

(22) Filed: May 13, 2021

(65) Prior Publication Data

US 2022/0365900 A1    Nov. 17, 2022

(51) Int. Cl.
| | | |
|---|---|---|
| G06F 15/17 | (2006.01) | |
| G06F 15/78 | (2006.01) | |
| G06F 9/54 | (2006.01) | |
| G06F 9/445 | (2018.01) | |
| G06F 9/4401 | (2018.01) | |
| G06F 13/40 | (2006.01) | |

(52) U.S. Cl.
CPC ............ *G06F 15/17* (2013.01); *G06F 9/4406* (2013.01); *G06F 9/44505* (2013.01); *G06F 9/546* (2013.01); *G06F 13/4031* (2013.01); *G06F 15/7807* (2013.01)

(58) Field of Classification Search
CPC .... G06F 15/17; G06F 9/4406; G06F 9/44505; G06F 9/546; G06F 13/4031; G06F 15/7807
USPC ....................................................... 710/305
See application file for complete search history.

(56) References Cited

U.S. PATENT DOCUMENTS

| | | | | | |
|---|---|---|---|---|---|
| 4,901,232 | A | * | 2/1990 | Harrington | ........... G06F 13/126 710/6 |
| 5,276,848 | A | * | 1/1994 | Gallagher | ........... G06F 12/0811 711/E12.024 |
| 5,790,887 | A | * | 8/1998 | Brech | ................... G06F 13/126 710/21 |
| 5,829,033 | A | * | 10/1998 | Hagersten | ............. G06F 13/368 711/E12.033 |
| 5,901,291 | A | * | 5/1999 | Feeney | ................. G06F 13/128 370/465 |
| 6,009,472 | A | * | 12/1999 | Boudou | ................... G06F 15/17 709/201 |
| 6,163,809 | A | * | 12/2000 | Buckley | ................. H04L 69/08 709/204 |

(Continued)

*Primary Examiner* — Paul R. Myers
(74) *Attorney, Agent, or Firm* — Kowert, Hood, Munyon, Rankin & Goetzel, P.C.; Dean M. Munyon

(57) ABSTRACT

In an embodiment, a system on a chip (SOC) comprises a semiconductor die on which circuitry is formed, wherein the circuitry comprises a memory controller circuit and a plurality of networks formed from a plurality of individual network component circuits. The memory controller includes a PIO message control circuit that is configured to receive PIO messages addressed to individual network component circuits and determine whether to send the PIO messages to the individual network component circuits based on determine whether previous PIO messages are pending for the individual network component circuits. The PIO message control circuit is configured to delay a first PIO message at the PIO message control circuit in response to determining that previous PIO message is pending for the addressee of the first PIO message.

21 Claims, 9 Drawing Sheets

(56) References Cited

U.S. PATENT DOCUMENTS

| | | | |
|---|---|---|---|
| 6,247,084 B1* | 6/2001 | Apostol, Jr. | G06F 13/1684 |
| | | | 711/149 |
| 6,704,831 B1* | 3/2004 | Avery | G06F 13/404 |
| | | | 710/310 |
| 6,829,683 B1* | 12/2004 | Kuskin | G06F 12/0828 |
| | | | 711/143 |
| 7,376,125 B1* | 5/2008 | Hussain | H04L 47/6215 |
| | | | 370/352 |
| 7,962,562 B1* | 6/2011 | Budhia | G06F 3/067 |
| | | | 709/212 |
| 9,037,898 B2 | 5/2015 | Arroyo et al. | |
| 10,268,395 B1 | 4/2019 | Joshua et al. | |
| 10,789,001 B1* | 9/2020 | Kumaran | G06F 3/0659 |
| 2001/0033552 A1 | 10/2001 | Barrack et al. | |
| 2002/0035602 A1* | 3/2002 | Garcia-Luna-Aceves | |
| | | | H04L 12/1822 |
| | | | 709/204 |
| 2009/0109967 A1* | 4/2009 | Banerjee | H04L 49/65 |
| | | | 370/386 |
| 2017/0139721 A1* | 5/2017 | Feehrer | G06F 13/20 |
| 2017/0237671 A1 | 8/2017 | Rimmer et al. | |
| 2019/0303159 A1 | 10/2019 | Fryman et al. | |

* cited by examiner

US 11,609,878 B2

PROGRAMMED INPUT/OUTPUT MESSAGE CONTROL CIRCUIT

BACKGROUND

Technical Field

Embodiments described herein are related to system on a chip (SOC) integrated circuits and, more particularly, to controlling messages sent between components of the SOC.

Description of the Related Art

System on a chip (SOC) integrated circuits (ICs) generally include one or more processors that serve as central processing units (CPUs) for a system, along with various other components such as memory controllers and peripheral components. Additional components can be included with the SOC to form a given device. Communication between various components of the SOC is facilitated by one or more networks. Such networks are provided by individual network components of the SOC including network switches. During various modes of operation of the SOC, configuration messages such as programmed input/output (PIO) messages may be sent to the individual network components. The network components may be configured by, for example, writing values to registers of the individual network components. For the individual network components to be configured, however, configuration messages must reliability reach the individual network components to which the configuration messages are addressed.

BRIEF DESCRIPTION OF THE DRAWINGS

The following detailed description refers to the accompanying drawings, which are now briefly described.

Figure 1:
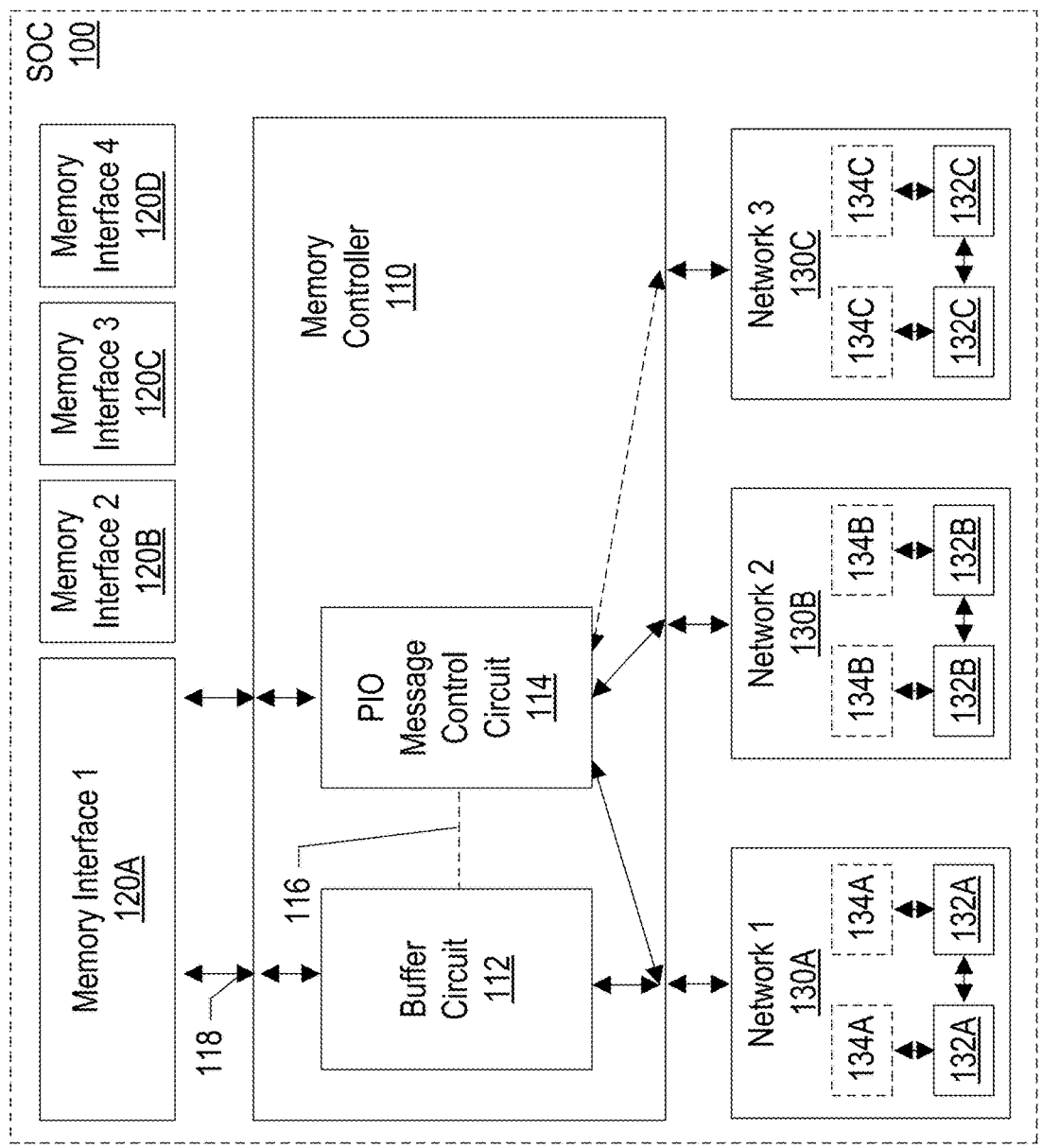
FIG. 1 a block diagram of one embodiment of a system on a chip (SOC) having a memory controller with a programmed input/output (PIO) message control circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a system on a chip (SOC) may include a plurality of networks formed by a plurality of individual network components (also referred to herein as network component circuits) such as network switches and optional network interfaces. These individual network components work together to pass messages from one part of a network to another part of the network (e.g., pass a message between a computer processor to a memory controller). During certain modes of operation, these individual network components are not themselves the addressee of messages and instead just pass messages along. During other modes of operation such as during a boot cycle or during debugging, an individual network component that is not typically the addressee of a message in other modes of operation may be individually addressed. Thus, an SOC may have circuitry configured to send messages to these individual components, but in various embodiments such circuitry may be used during certain modes of operation but not others.

By including circuitry configured to send messages to less frequently addressed components such as network switches and network interfaces, an SOC is operable to ensure that messages such as configuration messages or debug message addressed to such components are delivered. But the footprint of such circuitry takes up space that might otherwise be used for more frequently used components such as processing elements or memory caches. Additionally, in the case of individual network components that form a network, the number of such network components may be relatively large (e.g., dozens of network switches and network interfaces to form a network between a handful of processing clusters). Thus, if end-to-end credit logic was used to ensure message delivery to individual network components, such credit logic might have to be included in many locations on the SOC and only used in the infrequent instances in which individual network components are addressed. Similarly, if sideband connections are made between the individual network components and the computer processor sending configuration messages to the individual network components, such sideband connections would also take up space and be used infrequently. Accordingly, if network pathways that carry traffic to more frequently-addressed components can be used to carry messages to less frequently-addressed components without sacrificing an undue amount of physical space in an SOC, the capabilities and performance of the SOC can be improved.

Figure 2:
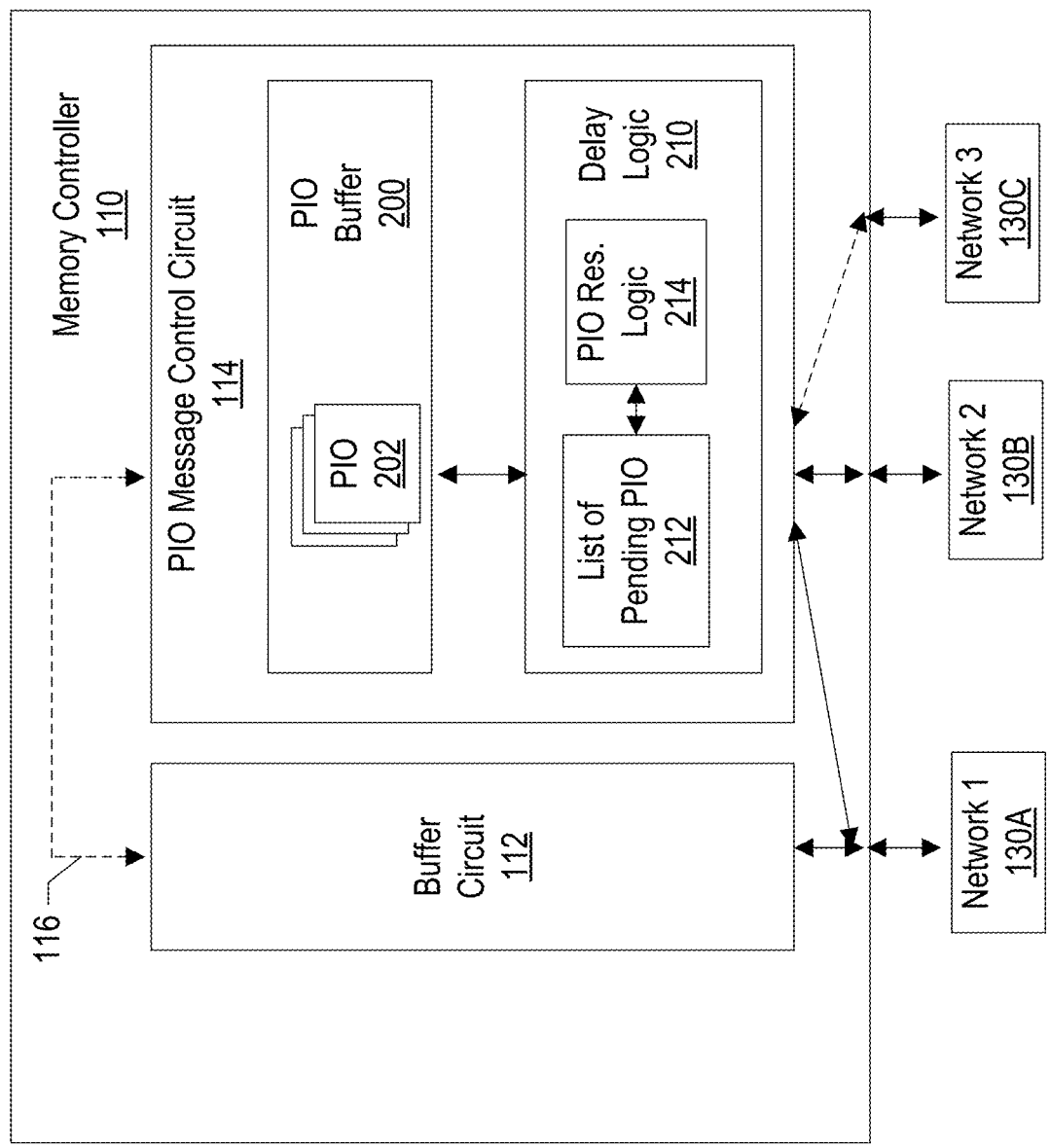
FIG. 2 is an expanded block diagram of the PIO message control circuit of FIG. 1.
Figure 3:
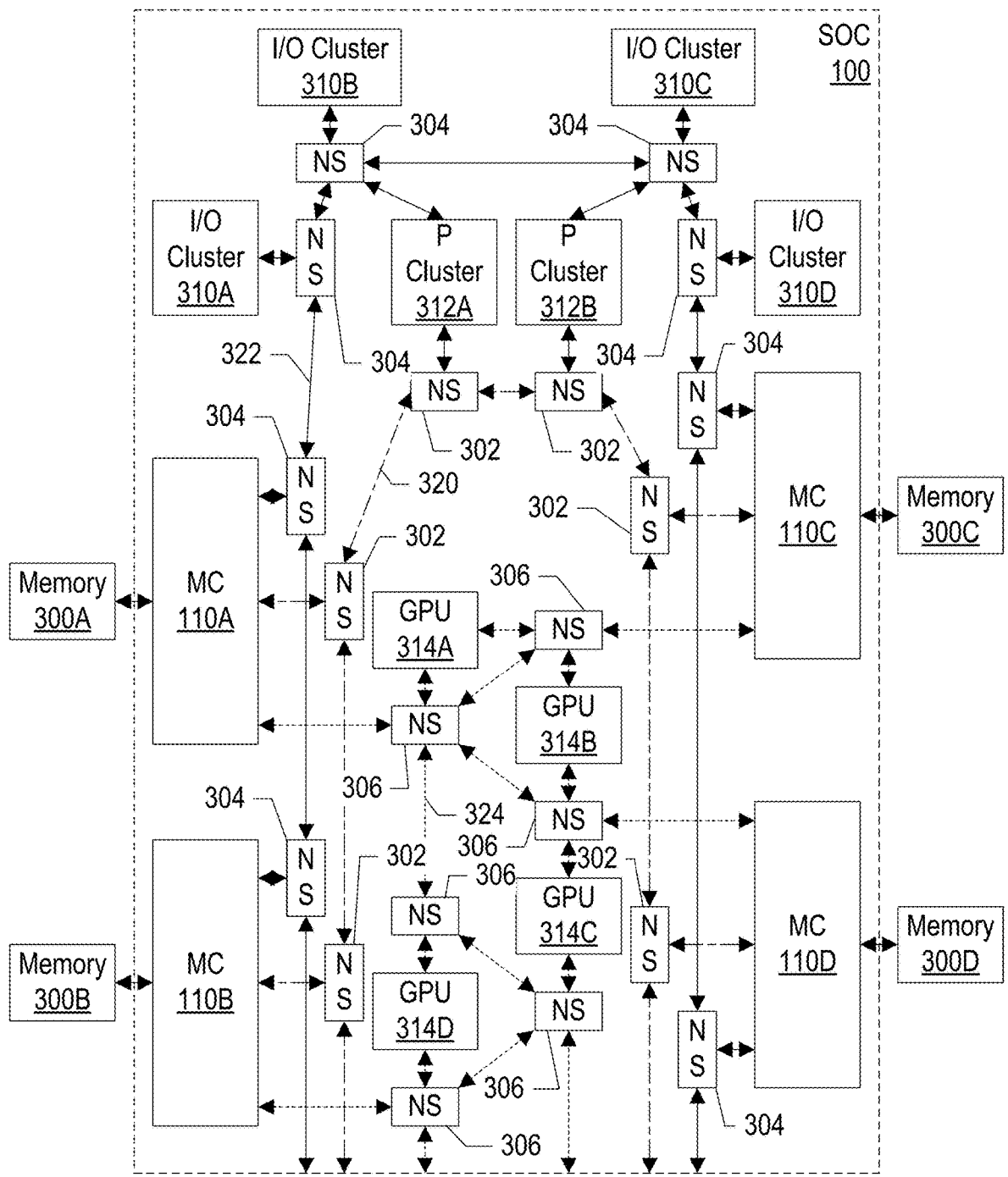
FIG. 3 is a block diagram of one embodiment of a system on a chip (SOC) having multiple networks for one embodiment.
Figure 4:
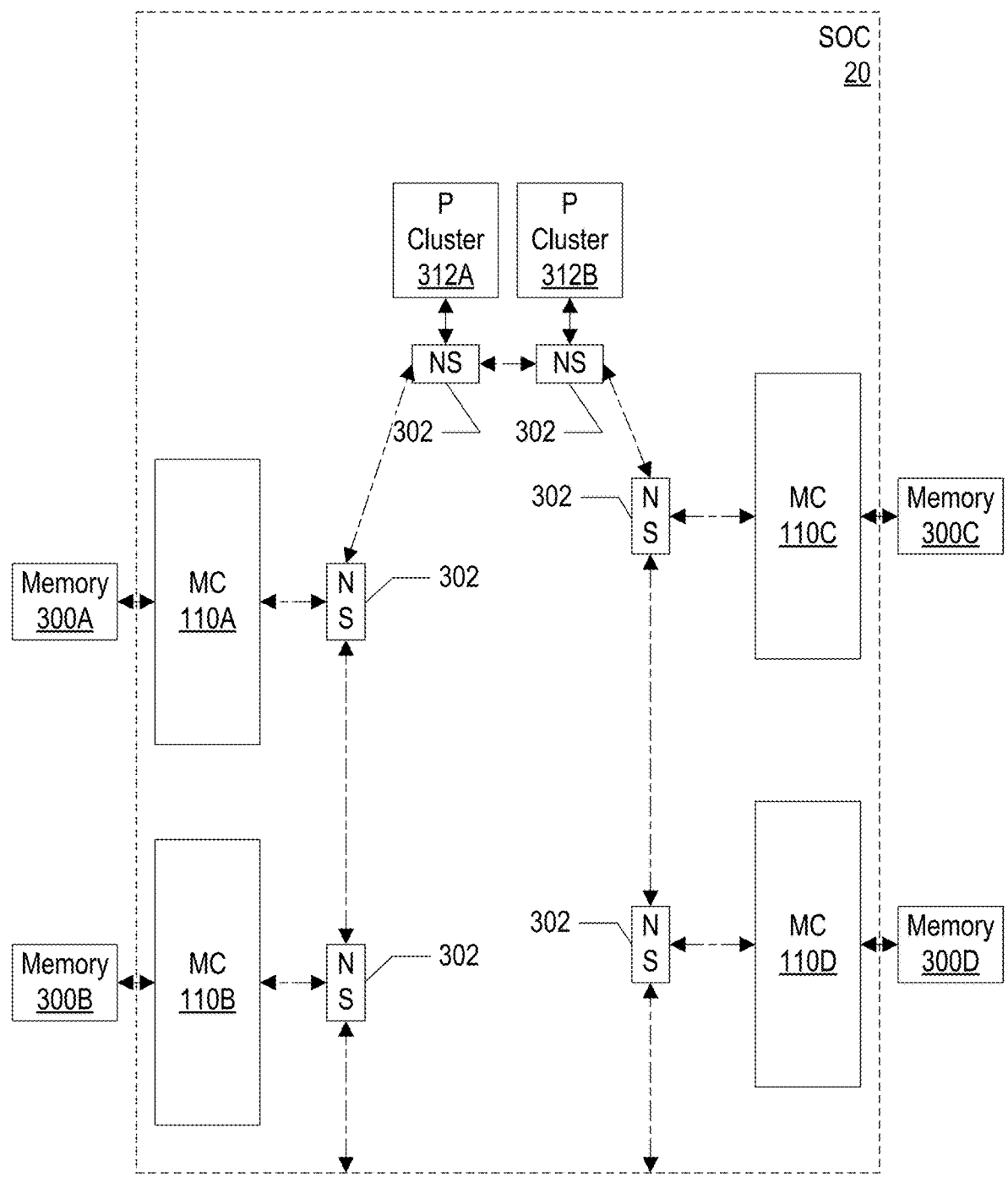
FIG. 4 is a block diagram of one embodiment of a system on a chip (SOC) illustrating one of the independent networks shown in FIG. 3 for one embodiment.
Figure 5:
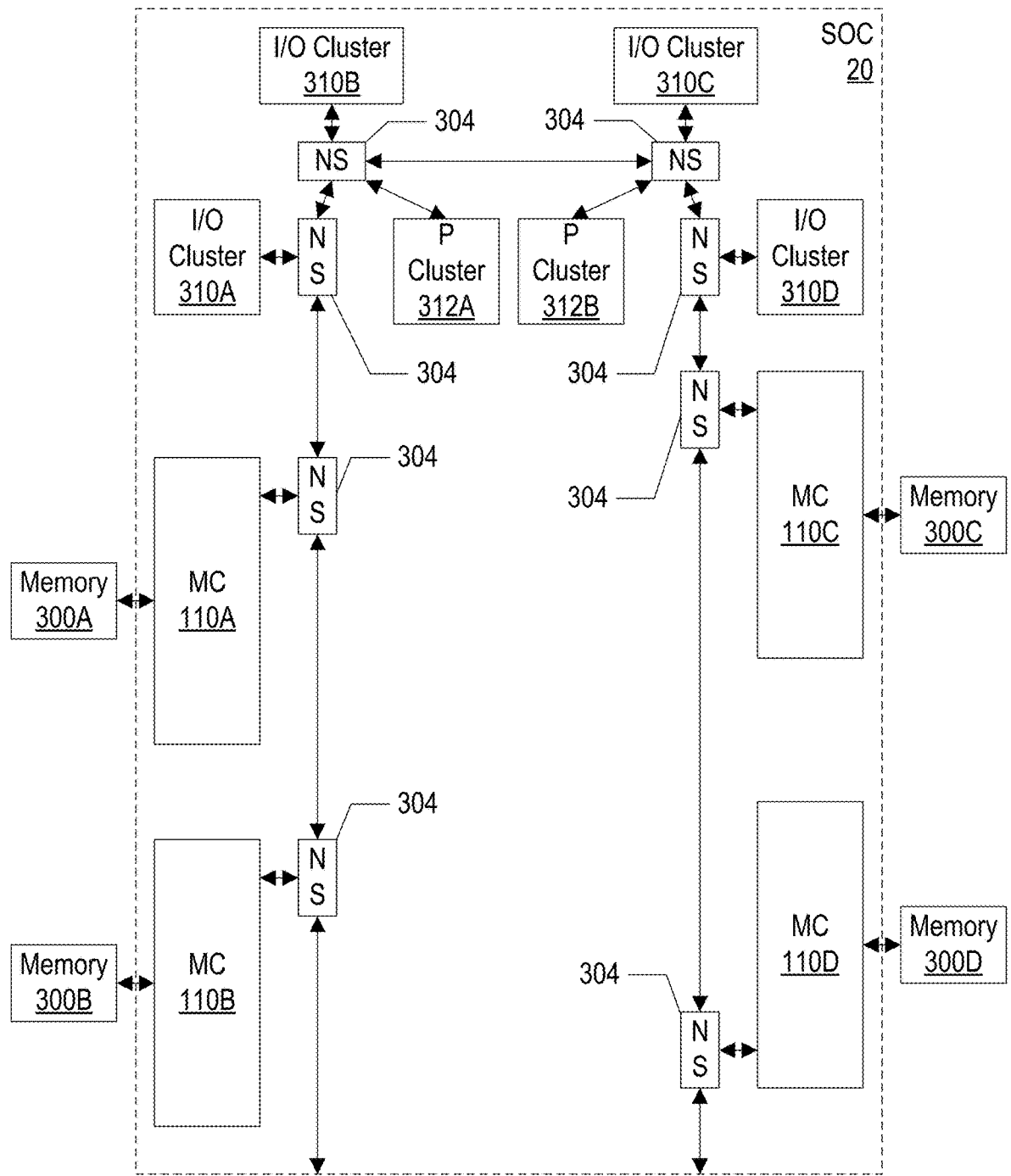
FIG. 5 is a block diagram of one embodiment of a system on a chip (SOC) illustrating another one of the independent networks shown in FIG. 3 for one embodiment.
Figure 6:
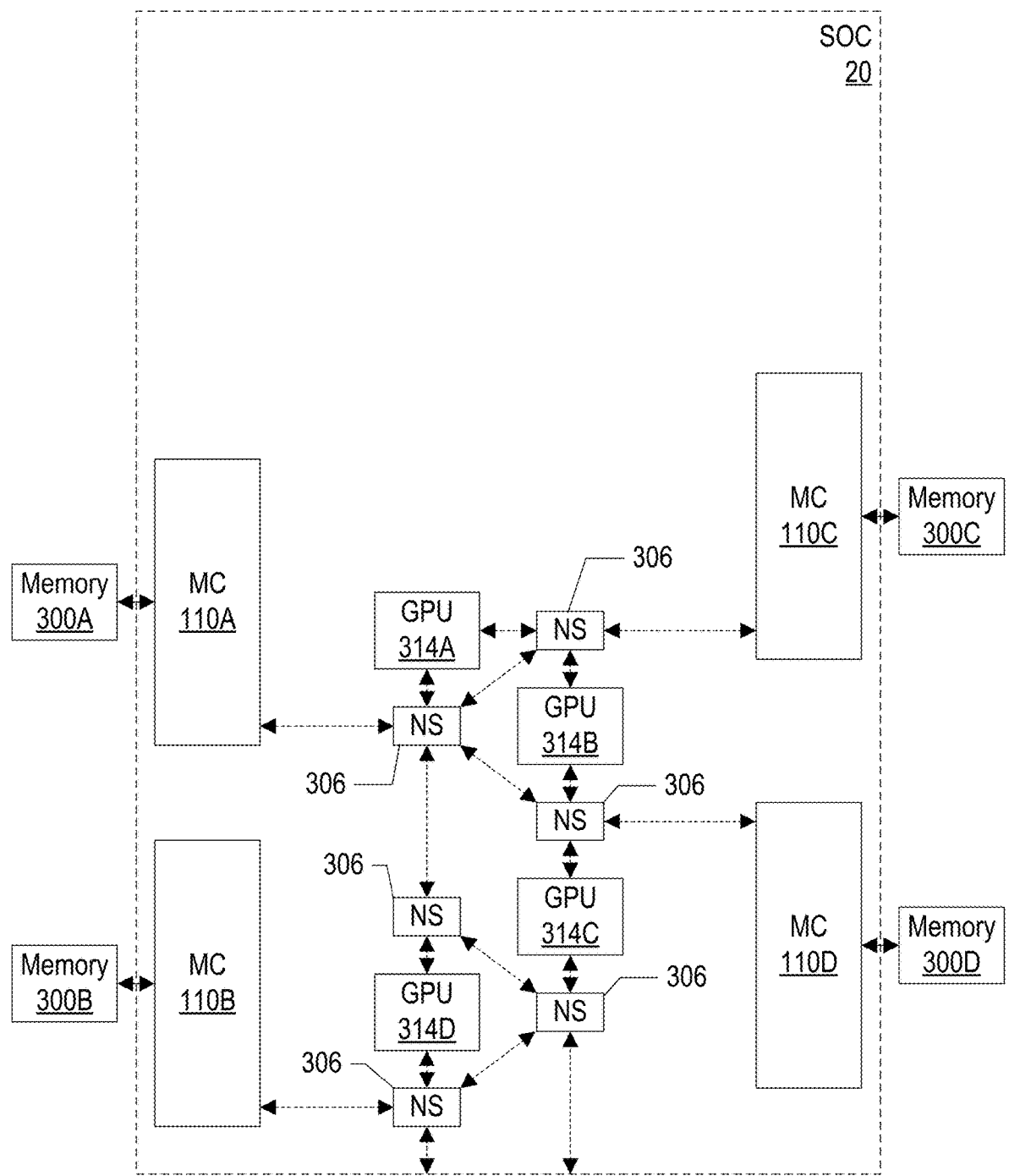
FIG. 6 is a block diagram of one embodiment of a system on a chip (SOC) illustrating yet another one of the independent networks shown in FIG. 3 for one embodiment.
Figure 7:
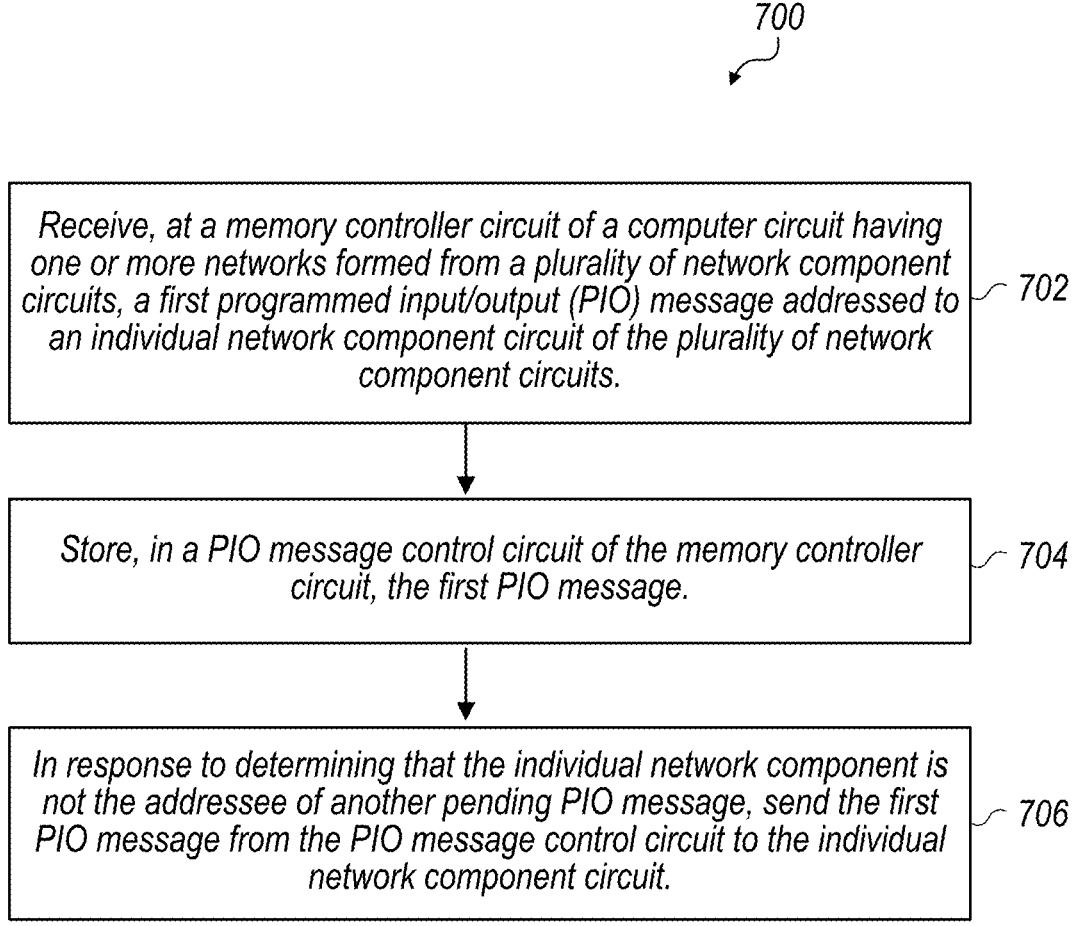
FIG. 7 is flowchart illustrating an embodiment of a PIO message control method in accordance with various embodiments.
Figure 8:
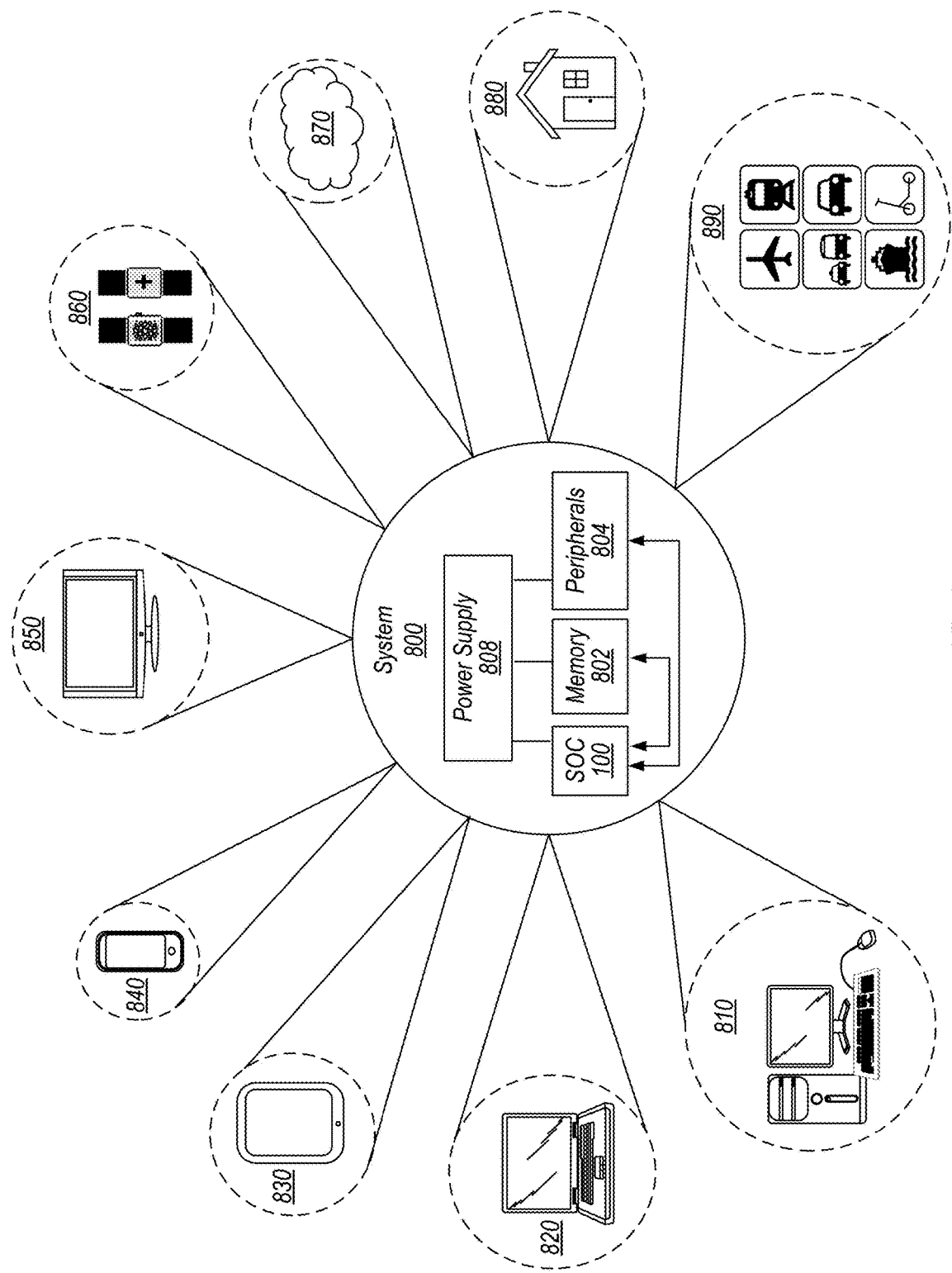
FIG. 8 is a block diagram of various embodiments of a system.
Figure 9:
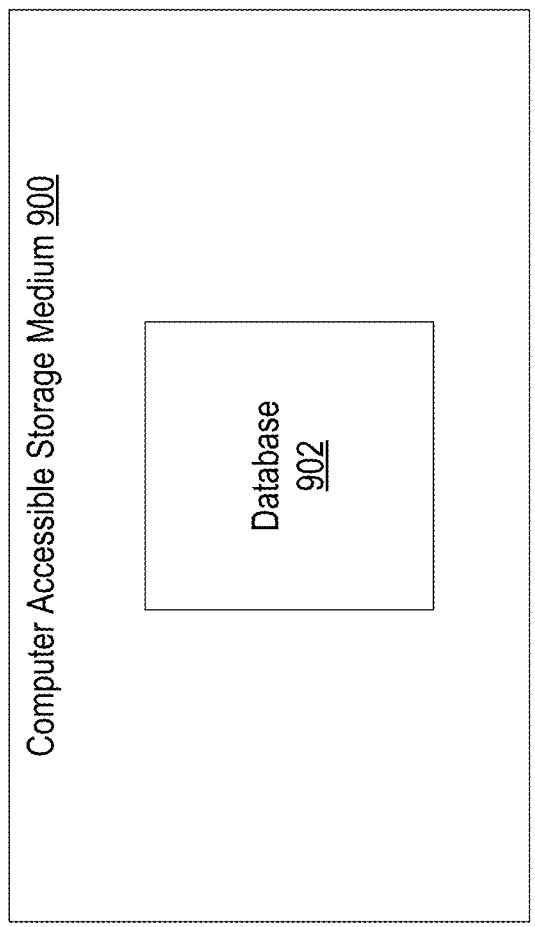
FIG. 9 is a block diagram of one embodiment of a computer accessible storage medium.

Turning now to the figures, FIG. 1 is a block diagram illustrating an example of an SOC with a memory controller having a PIO message control circuit. FIG. 2 is an expanded diagram of the memory controller of FIG. 1. FIG. 3 is an example of an SOC with a plurality of physically and logically independent networks. FIGS. 4-6 illustrate the various networks of FIG. 3 separately for additional clarity. FIG. 7 is a flowchart illustrating a method, and FIGS. 8 and 9 are example system and computer accessible storage medium embodiments. The description below will provide further details based on the drawings.

In an embodiment, the system of FIG. 1 may be implemented as an SOC and the components illustrated in FIG. 1 may be formed on a single semiconductor substrate die. The circuitry included in the SOC 100 may include a plurality of memory interfaces 120 (e.g., memory interfaces 120A-D), a memory controller 110, and a plurality of networks 130 (e.g., networks 130A-C).

In the embodiments shown in FIG. 1, SOC 100 includes one or more memory controllers 110 (also referred to herein as a "memory controller circuit") configured to control accesses to one or more computer memories (e.g., memories 300A-D shown on FIGS. 3-6). Memory controller 110 is configured to perform various functions including but not limited to controlling reads and writes to memory, facilitating caching, etc. In addition to these capabilities, memory controller 110 includes circuitry configured to receive PIO messages (using a buffer circuit 112) and distribute PIO messages (using a PIO message control circuit 114) to individual network component circuits that form one or more networks 130. As discussed herein, such PIO messages may contain for example, configuration information for the individual network component circuits. Such configuration information may be stored in one or more registers of the individual network component circuits. The functions of the individual network component circuits may be adjusted based on the values contained therein as discussed in further detail below.

Memory controller 110 includes a buffer circuit 112 and a PIO message control circuit 114. Buffer circuit 112 is configured to receive, via a particular network 130 (e.g., network 1 130A as shown in FIG. 1), PIO messages addressed to various components of SOC 100 including various individual network component circuits that form the networks 130A-C. In various embodiments, for example, buffer circuit 112 receives PIO message from a computer processor (e.g., a P cluster 312A-312B shown in FIG. 3). Buffer circuit 112 is configured to store the PIO messages until PIO message control circuit 114 is able to process them (e.g., distribute the PIO messages as discussed herein) to prevent PIO messages from being dropped. In various embodiments, buffer circuit 112 is connected to PIO message control circuit 114 directly via a direct path 116, but in other embodiments buffer circuit 112 is connected to PIO message control circuit 114 via other components of SOC 100. For example, buffer circuit 112 may be connected to PIO message control circuit 114 via a path 118 that goes from buffer circuit 112, out of memory controller 110, into memory interface 1 120A (also referred to herein as a "memory interface circuit"), through memory interface 1 120A, back to memory controller 110, and to PIO message control circuit 114.

In various embodiments, PIO message control circuit 114 is configured to receive PIO messages, store PIO messages, send PIO messages to their respective addressees, receive indications that PIO messages have been resolved, and determine whether a particular PIO message is still pending or has been resolved. As discussed above, PIO message control circuit 114 is configured to receive PIO messages from buffer circuit 112 either directly via direct path 116 or by a path 118 through other components of SOC 100. Individual PIO messages are addressed to a particular component (e.g., a particular network switch 132, a particular network interface 134, another component) that is used to form a network 130 (or is connected to a network 130). As shown in FIG. 1, PIO message control circuit 114 is connected to a plurality of networks 130. In FIG. 1, this is represented by solid lines connecting PIO message control circuit 114 to network 1 130A and network 2 130B. In some embodiments, PIO message control circuit 114 is optionally connected to all of the networks 130A-C including network 3 130C as indicated by the dashed line. In other embodiments, however, PIO message control circuit 114 is not connected to every network 130 on SOC 100. PIO messages may be addressed to individual components using any of a number of suitable methods. PIO message control circuit 114 is discussed in additional detail herein in reference to FIG. 2.

SOC 100 includes one or more networks 130 (e.g., networks 130A-130C as shown in FIG. 1). In some embodiments, the networks 130 are physically independent (e.g., having dedicated wires and other circuitry that form the network) and logically independent (e.g., communications sourced by agents in the SOC 100 may be logically defined to be transmitted on a selected network of the plurality of networks and may not be impacted by transmission on other networks). As discussed above, in some embodiments all of the networks 130 in a SOC 100 are connected to PIO message control circuit 114 (e.g., networks 130A-C are connected to PIO message control circuit 114), but in other embodiments a subset of the networks 130 are connected to PIO message control circuit 114 (e.g., networks 130A-B are connected to PIO message control circuit 114 but network 3 130C is not).

In various embodiments, networks 130 are formed by network component circuits that include network switches 132 and optional network interfaces 134. In the embodiments shown in FIG. 1, three networks 130A-C are formed by three sets of network components (e.g., network switches 132A and network interfaces 134A form network 1 130A, network switches 132B and network interfaces 134B form network 2 130B, and network switches 132C and network interfaces 134C form network 3 130C) although any number of networks 130 may be present. In various embodiments, networks 130A-130C are physically and logically separate and are formed by respective sets of physically and logically separate network switches 132 and network interfaces 134. For example, a communication on network 130A is unaffected by a communication on network 130B, and vice versa. As will be understood, the various network switches 132 define network pathways through SOC 100 and connect various components of SOC 100 together. As discussed herein, some of such components are configured to send and/or receive communications over the networks 130 during runtime and are referred to herein as "agents." Agents include but are not limited to memory controller 110 shown in FIGS. 1 and 2 as well as components such as processor clusters (P clusters), input/output (I/O) clusters, and graphics processing units (GPUs) discussed in further detail in reference to FIGS. 3-6.

In various embodiments, an optional network interface 134 (e.g., a network interface 134A, 134B, or 134C, also referred to herein as "network interface circuits") is used to connect one or more agents to a network 130 (e.g., a network interface 134B is used to connect an agent to network 130B). Accordingly, network interfaces 134A-C are indicated in dashed lines in FIG. 1. In some embodiments, a network interface 134A, 134B, or 134C is included in the agent (e.g., a network interface 134B included in memory controller 110). The network interfaces 134A-C may be configured to transmit and receive traffic on the networks 130A-C on behalf of the corresponding agents. The network interfaces 134A-C may be configured to convert or modify communications issued by the corresponding agents to conform to the protocol/format of the networks 130A-C, and to remove modifications or convert received communications to the protocol/format used by the agents. Thus, the network interfaces 134A-C may be used for agents that are not specifically designed to interface to the networks 130A-C directly. In some cases, an agent may communicate on more than one network (e.g., memory controller 110 communicates on both networks 130A-B in FIG. 1 and in some embodiments on network 130B). In instances, for example, when an agent is coupled to both network 130A and 130B, a corresponding network interface 134A or 134B may be configured to separate traffic issued by the agent to the networks 130A or 130B according to which network 130A, 130B each communication is assigned. Any mechanism for determining with network 130A, 130B is to carry a given communication may be used (e.g., based on the type of communication, the destination agent for the communication, address, etc. in various embodiments). Similarly, network interfaces 134A and 134B may be configured to separate traffic on the networks 130A and 130B assigned to the corresponding agent.

In contrast, some agents may not include or may not be coupled to network interfaces 134 and instead are connected to one or more networks 130 by being coupled to a network switch 132. Since the network interfaces 134 are optional and may not be needed for agents the support the networks 130A-C directly, the network interfaces 134 will be omitted from the remainder of the drawings for simplicity. However, it is understood that the network interfaces 134 may be employed in any of the illustrated embodiments by any agent or subset of agents, or even all of the agents.

In various embodiments, the SOC 100 includes a plurality of memory interfaces 120 (e.g., memory interfaces 120A-D). The memory interfaces 120 are configured to facilitate communication between memory controller 110 and memories to which the memory controller 110 is connected (e.g., a memory 300A-D shown in FIG. 3). In various embodiments, the memory interfaces 120 correspond to different address ranges in the memory and include caching capability. As shown in FIG. 1, a path 118 from buffer circuit 112 to PIO message control circuit 114 may go through a memory interface 120 (e.g., memory interface 1 120A as shown in FIG. 1).

Accordingly, memory controller 110 with a PIO message control circuit 114 may be configured to facilitate configuration of some or all of the various individual network components that form one or more networks 130 within the SOC 100. In various embodiments, PIO message control circuit 114 may facilitate sending PIO messages addressed to individual network switches 132 (e.g., network switches 132A-C) and/or individual network interfaces 134 (e.g., network interfaces 134A-C). As discussed below, such PIO messages may configure the functions of such individual network component circuits by, for example, updating one or more configuration values stored in configuration registers. As discussed below, PIO message control circuit 114 may also be configured to distribute PIO messages to other components coupled to networks 130 such as I/O bridges or other components that may be the addressee of PIO messages during certain limited states of SOC 100 such as during boot-up or during a debug operation. Because PIO message control circuit 114 is configured to delay sending a PIO message addressed to its addressee when a previous PIO message addressed to that same addressee is pending, PIO message control circuit 114 is able to ensure that the addressee of a PIO message is able to receive it. Accordingly, in various embodiments, a SOC 100 that includes a PIO message control circuit 114 is able to ensure PIO messages are delivered to addressees without, for example, credit logic circuits usable to control data frame transmissions in the networks 130 or separate sideband transmission paths between the source of the PIO messages and the addressees. In various embodiments, therefore, with a PIO message control circuit 114, network paths that are useable to carry traffic in other modes (such as runtime) may be used to transmit PIOs (in other modes such as during a boot cycle or during a debug mode) to components that form networks 130 and/or are connected to the networks 130.

Referring now to FIG. 2, an expanded block diagram illustrates additional detail about memory controller 110. In the embodiment shown in FIG. 2, PIO message control circuit 114 includes a PIO buffer circuit 200 that is configured to store PIO messages 202 that have been received from buffer circuit 112. When a particular PIO message 202 is being delayed (e.g., because a prior PIO message with the same addressee is still pending), it may be stored in PIO buffer circuit 200. PIO message control circuit 114 includes a delay logic circuit 210 configured to determine whether to delay a PIO message 202 or to send it to its addressee.

As discussed above, PIO message control circuit 114 is configured to receive PIO message 202 from buffer circuit 112 (either via direct path 116 or a path 118 through other components of SOC 100). After receiving a PIO message 202 addressed to an individual component, PIO message control circuit 114 determines whether to send the PIO message 202 to its addressee. In particular PIO message control circuit 114 is configured to first determine whether a previous PIO message 202 that was addressed to the same addressee is still pending.

As will be understood, PIO messages 202 include instructions for the addressee to perform a designated task (e.g., load a value into a register) and to respond when the designated task has been performed. As used herein, therefore, a PIO message 202 is "pending" if no response has been received indicating that the designated task has been performed. If a response has been received indicating that the designated task has been performed, then as used herein, the PIO message 202 is "resolved." In various embodiments, a particular PIO message control circuit 114 is configured to send PIO messages 202 to a particular address range in SOC 100 and to receive the responses to the PIO messages 202 (other PIO message control circuits 114 of other memory controllers 110 are configured to send PIO messages to other address ranges as discussed below). Accordingly, because PIO messages 202 are sent to particular components by the particular PIO message control circuit 114 and responses are received from those particular components by the particular PIO message control circuit 114, the particular PIO message control circuit 114 is able to determine whether a given PIO message 202 addressed to an addressee in its assigned address range is pending or resolved. In various embodiments, delay logic circuit 210 of PIO message control circuit 114 maintains a list 212 (or table or other record) of pending PIOs for the addressees assigned to PIO message control circuit 114. In various embodiments, PIO resolution logic 214 is configured to read list 212 to determine wither a previous PIO message 202 is pending for a particular addressee and to update list 212 when a previous PIO message 202 for a particular addressee is resolved. In various embodiments, PIO message control circuit 114 is also configured relay responses to PIO message 202 back to the originator of the PIO message 202 (e.g., by sending the response to the buffer circuit 112 for the buffer circuit 112 to relay back to the computer processor that generated the PIO message 202). In some embodiments, buffer circuit 112 receives PIO messages 202 via a particular network 130 (e.g., network 1 130A). In embodiments in which networks 130A-C are physically and logically independent from one another, therefore, a PIO message 202 transmitted via network 1 130A cannot be received by a component on network 2 130B or network 3 130C without an intermediary. In such embodiments, PIO message control circuit 114 is configured to act as such an intermediary, allowing a computer processor connected only to network 1 130A to send PIO message 202 to components on networks 130B-C, for example. As discussed herein, therefore, a PIO message 202 can be sent to a particular addressee using a network path useable for other network traffic and without the computer processor having to have a direct path (either via a sideband or via communication on the same network 130) to the addressee.

Thus, in various embodiments, PIO message control circuit 114 is configured to receive (e.g., from buffer circuit 112) a first PIO message 202 addressed to a particular addressee (e.g., an individual network component circuit). The PIO message control circuit 114 is configured to then determine (e.g., by accessing list 212) whether a previous PIO message 202 is still pending for the addressee of first PIO message 202. Based on a detection of a previous PIO message 202 not being pending for the individual network component circuit when the first PIO message 202 is received, PIO message control circuit 114 is configured to send the first PIO message 202 along to its addressee (e.g., via one of networks 130A-C). In contrast, based on a detection of a previous PIO message 202 being pending for the individual network component circuit when the first PIO message 202 is received, PIO message control circuit 114 is configured to delay the first PIO message 202 at the PIO control circuit 114 (e.g., in PIO buffer circuit 200). PIO message control circuit 114 is also configured to receive responses to PIO messages 202 (e.g., a response to the previous PIO message 202). In response to receiving a response to a PIO message 202, PIO resolution logic 214 is configured to update list 212. In cases in which a PIO message 202 that is addressed a particular addressee is being delayed in PIO buffer circuit 200 because a previous PIO message 202 was still pending for that particular addressee, PIO message control circuit 114 is configured to send the delayed PIO message 202 to its addressee after receiving a response to the previous PIO message 202.

FIG. 3 is a block diagram of one embodiment of a system on a chip (SOC) 100 having multiple networks for one embodiment. In the embodiment of FIG. 3, the SOC 100 includes a plurality of processor clusters (P clusters) 312A-312B, a plurality of input/output (I/O) clusters 310A-310D, a plurality of memory controllers 110A-110D, and a plurality of graphics processing units (GPUs) 314A-314D. As implied by the name SOC, the components illustrated in FIG. 3 (except for the memories 300A-300D in this embodiment) may be integrated onto a single semiconductor die or "chip." However, other embodiments may employ two or more dies coupled or packaged in any desired fashion. Additionally, while specific numbers of P clusters 312A-312B, I/O clusters 310A-310D, memory controllers 110A-110D, and GPUs 314A-314D are shown in the example of FIG. 3, the number and arrangement of any of the above components may be varied and may be more or less than the number shown in FIG. 3. The memories 300A-300D are coupled to the SOC 100, and more specifically to the memory controllers 110A-110D respectively as shown in FIG. 3.

In the illustrated embodiment, the SOC 100 includes three physically and logically independent networks formed from a plurality of network switches 302, 304, and 306 as shown in FIG. 3 and interconnects therebetween, illustrated as arrows between the network switches and other components.

Additionally, as discussed above, in various embodiments, optional network interfaces (e.g., network interfaces 134A-C discussed in reference to FIG. 1) may be used to couple various components to the networks and might, for example, be disposed between networks switches 302, 304, 306 and other components (e.g., disposed between memory controller 110A and network switch 302, between P cluster 312A and network switch 304, between I/O cluster 310D and network switch 304, between GPU 314B and network switch 306, etc.). Other embodiments may include more or fewer networks. The network switches 302, 304, and 306 may be instances of network switches 132 (e.g., network switches 132A, 132B, 132C shown on FIG. 1). The plurality of network switches 302, 304, and 306 are coupled to the plurality of P clusters 312A-312B, the plurality of GPUs 314A-314D, the plurality of memory controllers 110A-110B, and the plurality of I/O clusters 310A-310D as shown in FIG. 3. The P clusters 312A-312B, the GPUs 314A-314B, the memory controllers 110A-110B, and the I/O clusters 310A-310D may all be examples of agents that communicate on the various networks of the SOC 100. Other agents may be included as desired. In various embodiments, one of more network interfaces (not shown in FIG. 3) are disposed between one or more network switches 302, 304, and 306 and the agents. In embodiments in which such network interfaces are present, such network interfaces may be instances of network switches 132 (e.g., network switches 132A, 132B, 132C shown on FIG. 1).

In FIG. 3, a central processing unit (CPU) network is formed from a first subset of the plurality of network switches (e.g., network switches 302) and interconnect therebetween illustrated as short dash/long dash lines such as reference numeral 320. The CPU network couples the P clusters 312A-312B and the memory controllers 110A-110D. An I/O network is formed from a second subset of the plurality of network switches (e.g., network switches 304) and interconnect therebetween illustrated as solid lines such as reference numeral 322. The I/O network couples the P clusters 312A-312B, the I/O clusters 310A-310D, and the memory controllers 110A-110B. A relaxed order network is formed from a third subset of the plurality of network switches (e.g., network switches 306) and interconnect therebetween illustrated as short dash lines such as reference numeral 324. The relaxed order network couples the GPUs 314A-314D and the memory controllers 110A-110D. In an embodiment, the relaxed order network may also couple selected ones of the I/O clusters 310A-310D as well. As mentioned above, the CPU network, the I/O network, and the relaxed order network are independent of each other (e.g., logically and physically independent).

In various embodiments, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example. In various embodiments, ordering is performed based on arbitration weights that are stored in configuration registers of the network switches 302, 304, 306 (and optionally network interfaces, which are omitted from FIGS. 3-6). Arbitration weights may be used to facilitate quality-of-service (QoS) in ordering such as giving higher priority to traffic on CPU and I/O networks compared to traffic on the related ordered network. Additionally, arbitration weights may be used to ensure certain components receive a higher QoS than others. For example, P cluster 312B may be assigned a higher QoS than I/O cluster 310C. Arbitration weights may be assigned using PIO messages addressed to the network switches 302, 304, 306 (and optionally network interfaces) as discussed here.

The interconnect between the network switches 302, 304, and 306 may have any form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

The arrangement of agents in FIG. 3 may be indicative of the physical arrangement of agents on the semiconductor die forming the SOC 100, in an embodiment. That is, FIG. 3 may be viewed as the surface area of the semiconductor die, and the locations of various components in FIG. 3 may approximate their physical locations with the area. Thus, for example, the I/O clusters 310A-310D may be arranged in the semiconductor die area represented by the top of SOC 100 (as oriented in FIG. 3). The P clusters 312A-312B may be arranged in the area represented by the portion of the SOC 100 below and in between the arrangement of I/O clusters 310A-310D, as oriented in FIG. 3. The GPUs 310A-314D may be centrally located and extend toward the area represented by the bottom of the SOC 100 as oriented in FIG. 3. The memory controllers 110A-110D may be arranged on the areas represented by the right and the left of the SOC 100, as oriented in FIG. 3.

In an embodiment, the SOC 100 may be designed to couple directly to one or more other instances of the SOC 100, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 3, the networks extend to the bottom of the SOC 100 as oriented in FIG. 3. Interface circuitry (e.g., serializer/deserializer (SERDES) circuits), not shown in FIG. 3, may be used to communicate across the die boundary to another die. In other embodiments, the networks may be closed networks that communicate only intra-die.

In various embodiments, different networks may have different topologies. In the embodiment of FIG. 3, for example, the CPU and I/O networks implement a ring topology, and the relaxed order may implement a mesh topology. However, other topologies may be used in other embodiments. FIGS. 6, 7, and 8 illustrate portions of the SOC 100 including the different networks: CPU (FIG. 4), I/O (FIG. 5), and relaxed order (FIG. 6). As can be seen in FIGS. 6 and 7, the network switches 302 and 304, respectively, form a ring when coupled to the corresponding switches on another die. If only a single die is used, a connection may be made between the two network switches 302 or 304 at the bottom of the SOC 100 as oriented in FIGS. 6 and 7 (e.g., via an external connection on the pins of the SOC 100). Alternatively, the two network switches 302 or 304 at the bottom may have links between them that may be used in a single die configuration, or the network may operate with a daisy-chain topology.

Similarly, in FIG. 6, the connection of the network switches 306 in a mesh topology between the GPUs 314A-314D and the memory controllers 110A-110D is shown. As previously mentioned, in an embodiment, one or more of the I/O clusters 310A-310D may be coupled to the relaxed order network was well. For example, I/O clusters 310A-310D that include video peripherals (e.g., a display controller, a memory scaler/rotator, video encoder/decoder, etc.) may have access to the relaxed order network for video data. In various embodiments, I/O clusters 310A-310D include I/O bridges that have configuration registers that may be configured using PIO messages as discussed herein. The network switches 306 near the bottom of the SOC 100 as oriented in FIG. 6 may include connections that may be routed to another instance of the SOC 100, permitting the mesh network to extend over multiple dies as discussed above with respect to the CPU and I/O networks. In a single die configuration, the paths that extend off chip may not be used.

In an embodiment, the physical separation of the I/O network from the CPU network may help the system provide low latency memory access by the processor clusters 312A-312B, since the I/O traffic may be relegated to the I/O network. The networks use the same memory controllers to access memory, so the memory controllers may be designed to favor the memory traffic from the CPU network over the memory traffic from the I/O network to some degree. The processor clusters 312A-312B may be part of the I/O network as well in order to access device space in the I/O clusters 310A-310D (e.g., with PIO messages). However, memory transactions initiated by the processor clusters 312A-312B may be transmitted over the CPU network. Thus, P clusters 312A-312B may be examples of an agent coupled to at least two of the plurality of physically and logically independent networks. The agent may be configured to generate a transaction to be transmitted, and to select one of the at least two of the plurality of physically and logically independent networks on which to transmit the transaction based on a type of the transaction (e.g., memory or PIO).

In various embodiments, one of memory controllers 110A-D is configured to control PIO messages addressed to the various components in SOC 100. In other embodiments, however, the various memory controllers 110A-D control PIO messages to subsets of the components in SOC 100. For example, in various embodiments, memory controller 110A is configured to control PIO message for components disposed in the top left quarter of SOC 100, memory controller 110B is configured to control PIO message for components disposed in the bottom left quarter of SOC 100, memory controller 110C is configured to control PIO message for components disposed in the top right quarter of SOC 100, and memory controller 110B is configured to control PIO message for components disposed in the top right quarter of SOC 100. The various components may have respective address ranges that are assigned to the various memory controllers 110A-D.

Various components depicted in FIGS. 3-6 may be configured using PIO messages (e.g., PIO messages 202 discussed in reference to FIG. 2) as discussed herein. In particular, components that form the networks such as network switches 302, 304, and 306 (and optional network interfaces) may be configured using PIO messages. Additionally or alternatively, in some embodiments, other components on the networks such as I/O clusters 310A-310D may be configured using PIO messages. In various embodiments, a component is configured by a PIO message by performing a requested action indicated in the PIO message. For example, a PIO message may include instructions to store a value in a configuration register. In some embodiments, for example, an arbitration weight may be received in a PIO message and stored in one or more registers that a configured to apply the arbitration weight to traffic on the networks to meet one or more QoS requirements. In some embodiments, the configuration register may control network routing paths facilitated by the as network switches 302, 304, and 306 (and optional network interfaces) and changing the value in the configuration register results in changes to network paths. As discussed herein, PIO messages may also be used to configure other components such as I/O bridge circuits or other components with configuration registers. For example, such configurations may be performed during a boot cycle to set configuration values (such as arbitration weights) to be used at a subsequent runtime operating mode. In various embodiments, a PIO message addressed to a particular network component circuit may contain a configuration value for a single register of the particular network component circuit or may contain multiple configuration values for multiple registers. In addition to configurating values stored in registers, PIO message may also be used to debug various components of SOC 100 by, for example, requesting values that were stored in registers of the various components or writing values to the registers to perform debug tasks. Thus, as discussed herein, in various embodiments PIO messages may be distributed during particular operating modes of SOC 100 such as boot or debugging modes using the networks that are used to carry traffic at runtime. As discussed herein, in various embodiments, PIO message can therefore be sent to individual components without using credit logic to control access to the network or sideband communication channels.

FIG. 7 is a flowchart illustrating one embodiment of a method of controlling PIO messages on one or more networks 130 using a memory controller circuit 110 having a PIO message control circuit 114. At block 702, memory controller circuit 110 receives a first programmed input/output (PIO) message addressed to an individual network component circuit of the plurality of network component circuits (e.g., a PIO message addressed to a particular network switch 132A, 132B, 132C). At block 704, PIO message control circuit 114 stores the first PIO message. At block 706, in response to determining that the individual network component is not the addressee of another pending PIO message, the first PIO message is sent from the PIO message control circuit 114 to the individual network component to which it is addressed. In various embodiments, method 700 includes additional steps such as, for example, receiving an indication that first PIO message is resolved and/or receiving one or more PIO messages addressed to other network components.

Computer System

Turning next to FIG. 8, a block diagram of one embodiment of a system 800 is shown. In the illustrated embodiment, the system 800 includes at least one instance of a system on a chip (SOC) 100 coupled to one or more peripherals 804 and an external memory 802. A power supply (PMU) 808 is provided which supplies the supply voltages to the SOC 100 as well as one or more supply voltages to the memory 802 and/or the peripherals 154. In some embodiments, more than one instance of the SOC 100 may be included (and more than one memory 802 may be included as well). The memory 802 may include the memories 300A-300D illustrated in FIG. 3, in an embodiment.

The peripherals 804 may include any desired circuitry, depending on the type of system 800. For example, in one embodiment, the system 800 may be a mobile device (e.g., personal digital assistant (PDA), smart phone, etc.) and the peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multitouch display screens, keyboard or other input devices, microphones, speakers, etc. In other embodiments, the system 800 may be any type of computing system (e.g., desktop personal computer, laptop, workstation, net top etc.).

The external memory 802 may include any type of memory. For example, the external memory 802 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 802 may include one or more memory modules to which the memory devices are mounted, such as single inline memory modules (SIMMs), dual inline memory modules (DIMMs), etc. Alternatively, the external memory 802 may include one or more memory devices that are mounted on the SOC 20 in a chip-on-chip or package-on-package implementation.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

Computer Readable Storage Medium

Turning now to FIG. 9, a block diagram of one embodiment of a computer accessible storage medium 900 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 900 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 900 in FIG. 9 may store a database 902 representative of the SOC 100. Generally, the database 902 may be a database which can be read by a program and used, directly or indirectly, to fabricate the hardware comprising the SOC 100. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 100. The netlist may then be placed and routed to produce a data set describing geometric shapes to be applied to masks. The masks may then be used in various semiconductor fabrication steps to produce a semiconductor circuit or circuits corresponding to the SOC 100. Alternatively, the database 902 on the computer accessible storage medium 900 may be the netlist (with or without the synthesis library) or the data set, as desired.

While the computer accessible storage medium 900 stores a representation of the SOC 100, other embodiments may carry a representation of any portion of the SOC 100, as desired, including any subset of the components shown in FIGS. 1-6. The database 902 may represent any portion of the above.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
   a plurality of agent circuits that includes a memory controller circuit;
   a network coupled between the memory controller circuit and at least one other particular agent circuit of the plurality of agent circuits, the network including a plurality of network component circuits that are configured to receive and route a message sent over the network from the memory controller circuit to the particular agent circuit without being specified by the memory controller circuit as an addressee of the message, the plurality of network component circuits including at least one network switch; and wherein the memory controller circuit includes a programmed input/output (PIO) message control circuit that is configured to:
receive a first PIO message addressed to an individual network component circuit of the plurality of network component circuits;
based on a detection of a previous PIO message not being pending for the individual network component circuit when the first PIO message is received, send the first PIO message to the individual network component circuit; and
based on a detection of a previous PIO message being pending for the individual network component circuit when the first PIO message is received, delay the first PIO message at the PIO message control circuit.

2. The system of claim 1, wherein the PIO message control circuit is configured to:
based on the detection of the previous PIO message being pending for the individual network component circuit when the first PIO message is received:
delay the first PIO message at the PIO message control circuit until the previous PIO message is resolved; and
in response to receiving an indication that the previous PIO message is resolved, send the first PIO message to the individual network component circuit.

3. The system of claim 1,
wherein the network is one of a plurality of individual networks in the system that are physically and logically independent from one another; and
wherein the memory controller circuit is configured to receive PIO messages via a first network of the plurality of individual networks.

4. The system of claim 3, wherein the individual network component circuit is part of a second network of the plurality of individual networks.

5. The system of claim 1, wherein the memory controller circuit is configured to receive the first PIO message from a computer processor circuit, wherein a network path used to send the first PIO message to the individual network component circuit is useable for other network traffic, and wherein the computer processor circuit lacks a direct path to the individual network component circuit for a PIO message addressed to the individual network component circuit.

6. The system of claim 1, wherein the plurality of network component circuits lack credit logic circuits.

7. The system of claim 1, wherein the particular agent circuit is one of a processor cluster, input/output cluster, or graphics processing unit.

8. The system of claim 1, wherein the plurality of agent circuits includes a computer processor circuit, wherein the memory controller circuit includes a buffer circuit that is configured to receive the first PIO message from the computer processor circuit, wherein the buffer circuit is configured to send the first PIO message to a memory interface circuit, and wherein the PIO message control circuit is configured to receive the first PIO message from the memory interface circuit.

9. A system on a chip (SOC) comprising a semiconductor die on which circuitry is formed, wherein the circuitry comprises:
a plurality of agent circuits that includes a first memory controller circuit;
a first network coupled between the first memory controller circuit and at least one other particular agent circuit of the plurality of agent circuits, the first network including a first plurality of network component circuits that are configured to receive and route a message sent over the first network from the first memory controller circuit to the particular agent circuit without being specified by the first memory controller circuit as an addressee of the message; and
wherein the first memory controller circuit includes a first programmed input/output (PIO) message control circuit that is configured to:
receive a first PIO message addressed to an individual network component circuit of the first plurality of network component circuits; and
in response to determining that the individual network component circuit is not the addressee of another pending PIO message, send the first PIO message to the individual network component circuit.

10. The SOC of claim 9, wherein the first PIO message control circuit is configured to:
in response to determining that the individual network component circuit is the addressee of another PIO message that is pending:
delay the first PIO message at the first PIO message control circuit until the other PIO message is resolved; and
in response to receiving an indication that the other PIO message is resolved, send the first PIO message to the individual network component circuit.

11. The SOC of claim 9, wherein the circuitry further comprises:
a second network formed from a second plurality of network component circuits, wherein the second network is coupled to a second memory controller circuit that includes a second PIO message control circuit; and
wherein the second PIO message control circuit is configured to send PIO messages to the second plurality of network component circuits and is not configured to send PIO messages to the first plurality of network component circuits.

12. The SOC of claim 9, wherein the circuitry further comprises:
An input/output (I/O) bridge circuit coupled to the first network, wherein the I/O bridge circuit is the particular agent circuit;
wherein the first PIO message control circuit is configured to:
receive a second PIO message addressed to the I/O bridge circuit; and
in response to determining that the I/O bridge circuit is not the addressee of another PIO message that is pending, send the second PIO message to the I/O bridge circuit.

13. The SOC of claim 9, wherein the individual network component circuit includes a configuration register configured to store an arbitration weight, wherein the individual network component circuit is configured to use the arbitration weight to meet a quality-of-service requirement, and wherein the first PIO message includes the arbitration weight to be stored in the configuration register.

14. The SOC of claim 9, wherein the first plurality of network component circuits includes at least one network switch and at least one network interface.

15. A method comprising:
- receiving, at a first agent circuit of a computer system having a network formed from a plurality of network component circuits that couples the first agent circuit to a second agent circuit, a first programmed input/output (PIO) message addressed to an individual network component circuit of the plurality of network component circuits, wherein the individual network component circuit is configured to receive and route a message sent over the network from the first agent circuit to the second agent circuit without being specified by the first agent circuit as an addressee of the message;
- storing, in a PIO message control circuit of the first agent circuit, the first PIO message; and
- in response to determining that the individual network component circuit is not the addressee of another pending PIO message, sending the first PIO message from the PIO message control circuit to the individual network component circuit.

16. The method of claim 15, wherein the first PIO message includes a configuration value for a configuration register of the individual network component circuit.

17. The method of claim 16, wherein the configuration value includes an arbitration weight usable by the individual network component circuit.

18. The method of claim 16, wherein the configuration value adjusts a network path provided by the individual network component circuit.

19. The method of claim 16, wherein the receiving, storing, and sending are performed during a boot cycle of the computer system.

20. The method of claim 16, wherein the receiving, storing, and sending are performed without calculating credit for the individual network component circuit using credit logic.

21. A system comprising:
- a plurality of individual networks that are physically and logically independent from one another, the plurality of individual networks including a first network and a second network and being formed from a plurality of network component circuits; and
- a memory controller circuit configured to receive, via the first network, a first PIO message addressed to an individual network component circuit of the plurality of network component circuits that is part of the second network, wherein the memory controller circuit includes a programmed input/output (PIO) message control circuit that is configured to:
  - based on a detection of a previous PIO message not being pending for the individual network component circuit when the first PIO message is received, send the first PIO message to the individual network component circuit; and
  - based on a detection of a previous PIO message being pending for the individual network component circuit when the first PIO message is received, delay the first PIO message at the PIO control circuit.

\* \* \* \* \*